Nov. 22, 1938.     M. W. GATCH     2,137,739
ANIMAL TRAP
Filed Feb. 5, 1937
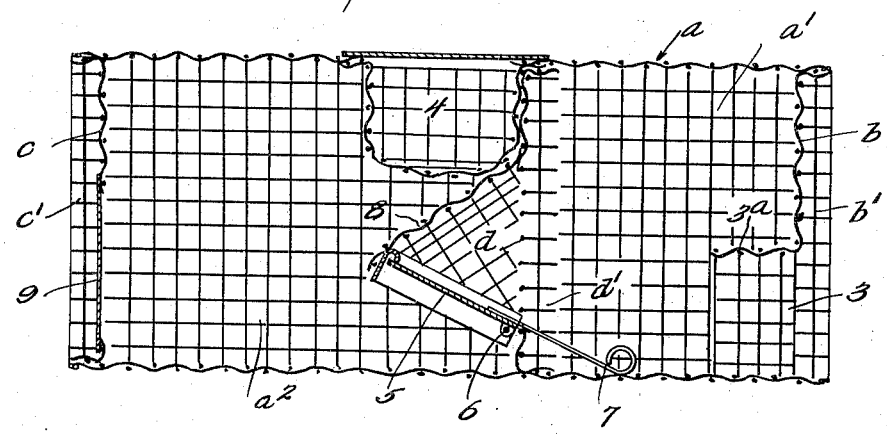
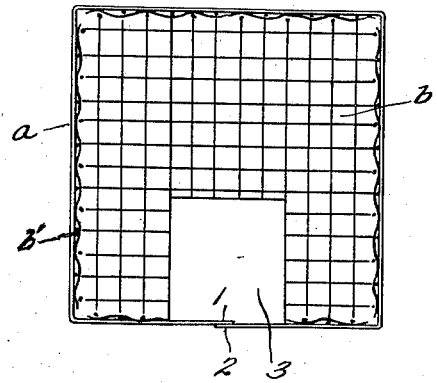
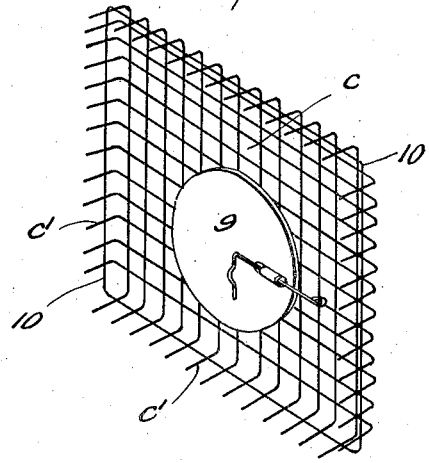
Inventor
M. W. Gatch
By Robert Watson
Attorney Patented Nov. 22, 1938

2,137,739

UNITED STATES PATENT OFFICE 2,137,739

ANIMAL TRAP

Milton W. Gatch, Baltimore, Md., assignor to The Gatch Wire Goods Company, Baltimore, Md., a corporation of Maryland Application February 5, 1937, Serial No. 124,313

1 Claim. (Cl. 220—19)

This invention relates to animal traps composed of woven wire netting, and particularly to certain details of construction which strengthen the trap and facilitate welding of its parts together. The trap body is composed of a piece of wire netting bent along parallel lines into the form of a hollow tube, rectangular in cross-section, and has its meeting edges overlapped and welded together. Rectangular end-pieces, also of woven wire netting, are provided, one having an inlet opening and the other having an outlet opening and a closure for the latter opening, and between said end-pieces is arranged a rectangular partition which divides the body portion into two compartments, this partition being also made of woven wire netting and carrying a trap door which is pivoted to it.

The end-pieces have their marginal portions bent to form flanges which project substantially at right angles to their body portions and at one side thereof. These end-pieces are made of such size that they will fit within the body of the trap with the flanges in close contact with its sides, and each end-piece is placed within the body with its flange projecting outward toward the end of the body and flush therewith. This arrangement facilitates spot welding of the end-pieces to the body of the trap, as one electrode of the welding tool can be inserted within the flange of an end-piece while the other is applied to the outer side of the body, and the flange can be quickly welded at numerous points to the body. The flanged end-pieces, secured in this way, strengthen the body against lateral distortion. The flanged partition is pushed into place in the central part of the body and its flange is welded to the body before the end-pieces are applied and welded. If the end-pieces and partition were made without flanges, difficulty would be experienced in securing them to the body, and if provided with flanges, as shown in the drawing, and these flanges were turned inwardly, it would be impossible to engage them with the electrode of a welding tool.

In the accompanying drawing,

Fig. 1 is a longitudinal central section through the trap;

Fig. 2 is an end view of the same, looking from right to left in Fig. 1, and,

Fig. 3 is a perspective view of the end-piece at the left-hand end of Fig. 1.

Referring to the drawing, $a$ indicates the body of the trap, composed of woven wire netting, bent into the form of a square tube and having its meeting edges 1, 2 overlapped and welded together, as indicated in Fig. 2. The body is relatively long and is divided into two compartments $a'$ and $a^2$, by a partition $d$ composed of woven wire. End-pieces $b$ and $c$, also of woven wire netting, are fitted within the ends of the trap body.

The end-piece $b$ has an opening 3 through which a small animal, such as a rat, may enter the compartment $a'$ and a short section of wire netting $3^a$ projects into the compartment $a'$ from the margins of this opening, forming a short passageway into the compartment. A receptacle 4 for containing bait is fitted into a suitable opening in the top of the body and projects into the compartment $a^2$ near the partition $d$. Below this bait container is arranged a tilting trap door 5 pivoted to the partition $d$ at 6, and a relatively heavy piece of wire 7, secured to the trap door, extends into the compartment $a'$ and normally holds the door in the inclined position shown. When the animal, after entering compartment $a'$, in reaching for the bait, puts its feet on the trap door, the latter rocks downwardly away from a wire hood 8 which is attached to the partition $d$ and extends over the door. When the animal trips the door and passes into the compartment $a^2$, the door returns to its normal position, preventing the return of the animal. To release the animal, a door 9 in the end-piece $c$ is opened.

Traps having inlet openings, trap doors, outlet openings and bait containers arranged substantially as above described are old, although the trap bodies have usually been of a different form from that shown in the drawing.

In my invention, the trap body is rectangular in cross-section throughout and the end-pieces and partition are correspondingly formed and fitted within the body. As shown in Fig. 3, the end-piece $c$ has its marginal portions turned over at one side of the body at right angles thereto, forming a flange $c'$, the parallel end portions of the wires forming the flange being held in alinement by a cross wire 10 in the flange. The partition $d$ has a similar flange $d'$ and the end-piece $b$ has a similar flange $b'$.

In assembling the parts of the trap, the partition $d$ is passed into the body portion $a$ through the right-hand end of the latter, Fig. 1, and positioned next to the bait container, with the flange $d'$ of the partition directed toward the right-hand end of the body. The flange is then spot welded at numerous points to the body, for this purpose one electrode of the spot welding tool being inserted through the right-hand end of the body and applied to the inner side of the flange and the other electrode being applied to the outer side of the body. The end-piece b is then positioned within the right-hand end of the body with its flange b' projecting outwardly and flush with said end, and the end-piece c is similarly positioned in the left-hand end of the body with its flange c' projecting outwardly. By this construction and arrangement of the end pieces, one electrode of a spot welding tool can be applied to the inner side of a flange while the other electrode is applied to the outer side of the body. The flanges are then welded to the body at numerous points.

What I claim is:

An animal trap comprising an oblong body, substantially rectangular in cross-section, a partition and end-pieces, rectangular in form, fitting within the body, the body, end-pieces and partition composed of woven wire netting, each end-piece having flanges at its edges projecting outwardly toward the adjacent end of the body and welded to the body, and the partition having flanges at its edges welded to the body, the flanges of the end-pieces and partition each including a cross wire.

MILTON W. GATCH.